Patented Sept. 19, 1939

2,173,187

UNITED STATES PATENT OFFICE

2,173,187

PROCESS FOR HYDRATING OLEFINS

Herbert G. Tanner, Ashley, Del., assignor to E. I. du Pont de Nemours & Company, Wilmington, Del., a corporation of Delaware No Drawing. Application February 25, 1937, Serial No. 127,763

4 Claims. (Cl. 260—641)

This invention relates to the catalytic art, and particularly to processes for the catalytic hydration of olefins. Still more particularly it relates to the preparation and use in catalytic hydration processes of catalysts having as active constituents certain complex inorganic compounds known as the heteropolyacids.

The hydration of olefins to alcohols has already been carried out indirectly through combination with sulfuric acid and subsequent hydrolysis of the alkyl sulfonic acid to the corresponding alcohol and by hydration with steam in the presence of volatile mineral acids. Other vapor phase catalytic processes for the hydration of olefins, such as ethylene and propylene, have been disclosed which involve the use of certain solid catalysts at temperatures varying from 100° C. to 400° C. and pressures varying from atmospheric to as high as 250 atmospheres. Special mention should be made of the use of the phosphates of various metals such as beryllium, cadmium, zinc, aluminum, boron, manganese, and copper which, prior to the present invention, were the most successful catalysts proposed for use in the hydration of gaseous olefins. Nevertheless, the preferred cadmium phosphate catalyst of the prior art has not proved particularly practical for commercial use on account of the low space-time-yields of alcohols obtained and high losses of olefins to polymerized products.

This invention has as an object to provide an improved catalytic process for hydrating olefins to the corresponding alcohols. A more specific object is the hydration of ethylene to ethyl alcohol, and still more specifically to carry out the aforesaid reaction by the use of new and improved catalysts comprising that class of compounds known as the heteropolyacids. Other objects will appear hereinafter.

These objects are accomplished by the following invention which comprises bringing a mixture of water vapor and an olefin at an elevated temperature in contact with a catalyst comprising a suitable porous supporting material, preferably of a siliceous nature, impregnated with a heteropoly acid, the complex anion of which includes one element from group VI, sub-group A of the Periodic table.

The term "heteropoly acid", used in connection with the description and claims of the present invention, is to be regarded as having the same scope as indicated in the following dissertation quoted from the authoritative chemical literature:

"The term 'polyacid' is applied to acids which contain several acidic radicals, such as pyrosulfuric acid, $(O(SO_3)_2)H_2$; pyrophosphoric acid $(O(PO_3)_2H_4$; tetrachromic acid $(O(CrO_3)_4)H_2$; and metatungstic acid, $H_2W_4O_{13}$. When polyacids contain only one kind of acidic radical they are termed 'isopolyacids', but if one of the radicals is derived from another negative element, the term 'heteropolyacid' is applied. The radicals of vanadic, tungstic, and molybdic acids unite with radicals of other fairly strong acids or with amphoteric metallic hydroxides, to form heteropolyacids. Examples of these are phosphotungstic, phosphomolybdic, and phosphovanadic acids, silico-tungstic or -molybdic acids, and borotungstic acid. It is distinctive of heteropolyacids that a single radical of one of the acids is united with many, perhaps twelve, radicals derived from the second acid." (See Ephraim, "Inorganic Chemistry" English edition, Gurney and Jackson, (1934) p. 434.)

The manner in which this invention is accomplished is set forth in the following examples which are intended to be illustrative only.

Example 1

A catalyst consisting of phosphotungstic acid supported on silica gel was prepared in the following manner. Twelve hundred cc. of silica gel screened 8 to 14 mesh grain size was placed in a porcelain vessel and to it was added a solution prepared from 400 cc. of water and 400 g. of phosphotungstic acid crystals $(P_2O_5.24WO_3.XH_2O)$. The material was then evaporated to dryness in an oven at 100° C. after which the temperature was raised to 200° C. for several hours.

One hundred twenty-five cubic centimeters of the catalyst described above was placed in a stainless steel pressure tube, ethylene was admitted to a pressure of 72 atmospheres and the system was heated to 275° C. Water vapor and ethylene in the mole ratio of 1:1.2 were then passed over the catalyst at a gaseous space velocity of 300 volumes of inlet reactants (calculated to standard conditions of temperature and pressure) per volume of catalyst per hour was bled off constantly at the exit end through a gas meter. The condensible products, water and alcohol, were condensed in a stainless steel trap under the reaction pressure. There was thus obtained in four hours a volume of aqueous condensate containing 19.64 weight per cent of ethyl alcohol, equivalent to the formation of 0.044 cc. pure alcohol per cc. of catalyst per hour, and representing a total conversion of water to ethyl alcohol per pass of 8.15%.

In a similar run in which only 40 cc. of catalyst was used, at a temperature of 255° C. and a pressure of 63 atmospheres, passing water and ethylene in the mole ratio of 1:1.2 over the catalyst at a gaseous space velocity of 2440 cc. per cc. of catalyst per hour, ethyl alcohol production was increased to 0.252 cc. per cc. of catalyst per hour. The aqueous condensate contained 13.3% alcohol and the conversion of water to alcohol was 5.66%.

By way of comparison with catalysts of the prior art, ethylene and water in the mole ratio of 1:1 were passed over 25 cc. of cadmium metaphosphate at a gaseous space velocity of 342 cc. per cc. of catalyst per hour, under 54 atmospheres pressure and a temperature of 250° C. Ethyl alcohol was thereby produced at the rate of 0.030 cc. per cc. of catalyst per hour, an aqueous condensate being obtained which contained 20% ethyl alcohol and representing 7.3% conversion of water per pass.

Under similar conditions silica gel impregnated with phosphoric acid gave less than 1.0% conversion to alcohol per pass.

*Example 2*

A catalyst consisting of silicotungstic acid supported on silica gel was prepared by adding a solution of 20 g. of silicotungstic acid in 20 cc. of water to 60 cc. of 8 to 14 mesh silica gel grannules and heating the mass to dryness at 150° C.

Twenty cc. of this catalyst mixed with 130 cc. of 20 mesh aluminum granules was charged into a stainless steel tube as in Example 1 above, and heated to 250° C. under an ethylene pressure of 73 atmospheres. Water and ethylene in the molar ratio of approximately 1:1 were passed over the catalyst at the temperature and pressure indicated, at the rate of 4900 cc. of mixed ethylene and water vapor (calculated to standard conditions), per cc. of catalyst, per hour. There was thus obtained a quanity of aqueous condensate containing 10.3% of ethyl alcohol equivalent to 4.3% conversion of water to alcohol.

*Example 3*

A catalyst consisting of phosphomolybdic acid supported on silica gel was prepared as follows: 12.5 g. of molybdenum trioxide was heated in an open vessel with 23 g. of 85% phosphoric acid. Water evaporated and the heating was continued until a temperature of 275° C. was reached. There resulted a thick, sticky product. Twenty-five cc. of water was added and the mixture was allowed to stand for 17 hours after which it had become of "syrupy" consistency. This material was mixed with 60 cc. of 8 to 14 mesh silica gel granules and heated for several hours at 160° C. This method of preparation yielded a product in which the molar ratio of $H_3PO_4$ to $MoO_3$ was 2.2:1.

Forty cubic centimeters of this catalyst mixed with 130 cc. of fused silica granules of 8 to 14 mesh size was placed in a steel reaction tube and heated to 260° C. Water was vaporized and mixed with ethylene in the molar ratio of 1:1 and the gaseous mixture passed over the catalyst at a gaseous space velocity of 2500 and at a pressure of 97 atmospheres. Under these conditions for each 100 cc. of liquid water introduced there was obtained 90 cc. of an aqueous condensate containing 20.5 weight per cent of ethyl alcohol, representing an 8.6 mole per cent conversion of water to alcohol.

*Example 4*

A chrome-phosphoric acid catalyst supported on silica gel was prepared by adding 10.1 g. of chromium sesquioxide to a solution consisting of 57.5 g. of 85% phosphoric acid and 100 cc. of water and heating the mixture to 120° C., maintaining the temperature until the chromium oxide dissolved. Water was then allowed to evaporate as the residual mass was heated to 230° C. After cooling, the product was dissolved in 100 cc. of water. Sixty cubic centimeters of this solution, containing 0.3 mole of phosphoric acid and 0.04 moles of chromium sesquioxide, was then mixed with 175 cc. of 8 to 14 mesh silica gel granules and heated to dryness at 110° C.

When employed for the hydration of ethylene to ethyl alcohol under substantially the same conditions described in Example 3 above, approximately 90 cc. of an aqueous condensate containing 8.2 weight per cent ethyl alcohol was obtained. The conversion of water to alcohol amounted to 3.4 mole per pass.

The above examples set forth certain well defined instances of the application of this invention but they are not to be considered as limitations thereof, since many modifications may be made without departing from the spirit and scope of the invention.

The synthesis of ethanol according to the reaction, $C_2H_4(g) + H_2O(g) = C_2H_5OH(g)$, is assisted by pressure. However, it is found that within the temperature range 150° to 300° C. little economic advantage is gained by pressures exceeding 100 atmospheres. It is preferable, therefore, to operate between the limits of 1 to 100 atmospheres and particularly within the range of 50 to 100 atmospheres.

With regard to the choice of temperature one is confronted with the fact that the maximum theoretical conversion at constant pressure is reduced with increase in temperature. As far as the alcohol equilibrium is concerned, the lowest possible operating temperature should be selected. High temperature, on the other hand, favors catalyst activity. As the result of experiments it is found that the practical operating temperature limits are 150° to 325° C. However, it is preferable to operate at around 200° to 300° C.

The preferred molar ratio of water to ethyene is from 1:1 to about 1:3, although a much higher excess of ethylene may be used. The space velocity expressed in terms of volumes of water vapor plus and equivalent amount of ethylene, calcuated to standard conditions of temperature and pressure, per volume of catalyst, per hour may vary from 200 to as high as 10,000. Ordinarily, however, it is preferred to operate at around 2000 to 3000. The unreacted gases may, if desired, be separated and recirculated through the system.

Inert gases, such as nitrogen, introduced into the reaction system effect considerable improvement in the conversion of ethylene to alcohol, but carbon dioxide is particularly effective as illustrated by the fact that an eythlene-carbon dioxide mixture containing 31% of the latter, when passed together with water at 5000 space velocity (based on the reactive components) over phosphotungstic acid at 270° C. and at 55 atmospheres pressure, produced a condensate containing 23.5% of alcohol by weight, corresponding to 9.8% conversion of water to alcohol. By comparison a run carried out under similar conditions but in the absence of carbon dioxide, yielded a condensate containing only 10.8% of alcohol or 4.4% conversion of water per pass.

As to the catalysts embodied in this invention, the invention is limited only to that class of compounds known as the "heteropolyacids" as defined above, and further limited in that one component of the heteropolyacid is an element of sub-group A of the sixth group of the periodic table. Typical examples of these are phosphomolybdic, boromolybdic, arsenomolybdic, and silicomolybdic acids; phosphothiomolybdic acid, phosphotungstic, and silicotungstic acide; phosphochromic acid, and many others. Although any one of these "heteropolyacids" may be used, it is preferable to select a member of the group consisting of phosphomolybdic, phosphotungstic, silicotungstic, and chrom-phosphoric acids. Preferably these catalysts are supported on silica gel although other siliceous supports such as silicic acid, Japanese acid clay, bentonite, kieselguhr, or asbestos may be used, or under other suitable mechanical conditions the support material may even be eliminated entirely.

Several methods may be employed for the preparation of the heteropolyacids. For example, an aqueous solution of ammonium tungstate and ammonium phosphate may be acidified with an excess of aqua regia, and then evaporated. Crystals of hydrated phosphotungstic acid will be deposited. An alternative procedure is to heat together phosphoric acid and molybdic oxide. For the preparation of complexes other than those containing phosphorus, Drechsil's well known ether extraction method is conveniently used. For instance, silicotungstic acid may be prepared by adding dropwise 150 cc. of concentrated hydrochloric acid to a boiling solution composed of 250 grams of $Na_2WO_4.2H_2O$ to which has been added 75 cc of 40 Bé. sodium silicate. The mixture is filtered, 100 cc. of concentrated hydrochloric acid is added to the filtrate, and the silicotungstic acid present is extracted with ether. Evaporation of the ether solution to which a little water has been added yields hydrated crystals of silicotungstic acid.

This process and the catalysts herein described may be applied to the hydration of olefins other than ethylene, such as propylene to isopropyl alcohol; and isobutylene, the hexenes, and heptenes to the corresponding alcohols.

Catalysts of the new type when used in the preferred process of this invention possess the advantage over catalysts of the prior art in that they are more resistant to the usual catalysts poisons such as hydrogen sulfide and organic sulfur compounds frequently present in the hydrocarbons obtained from petroleum or coal and are less hydroscopic than catalysts such as cadmium phosphate. They are characterized for the most part by high activity and long life and are easily and cheaply prepared.

Aside from their particular application to the hydration of olefins, they also find use in both liquid and vapor phase reactions involving the hydrogenation or dehydrogenation of vegetable and mineral oils and hydrocarbons where their poison-resistant characteristics are of particular value. Other uses are to be found in oxidation reactions such as the oxidation of alcohols and aldehydes as well as in analogous reactions such as halogenation, dehalogenation, amination, and deamination, and the like.

It is apparent that many widely different embodiments of this invention may be made without departing from the spirit and scope thereof and therefore it is not intended to be limited except as indicated in the appended claims.

I claim:

1. The process for the production of alcohols which comprises bringing a mixture of an olefin and water vapor at a temperature between 150° and 325° C. and a superatmospheric pressure into contact with a catalyst comprising a porous supporting material impregnated with a heteropoly acid, the complex anion of which includes an element of group VI, sub-group A of the periodic table, said reaction being further characterized in that it is carried out in the presence of an inert gas.

2. The process in accordance with claim 1 characterized in that the inert gas is carbon dioxide and is present in a substantial concentration.

3. The process for the production of ethanol which comprises bringing a mixture of ethylene and water vapor at a temperature between 150° and 325° C. into contact with a catalyst comprising as its essential ingredient a heteropolyacid, the complex anion of which includes an element from group VI, sub-group A of the periodic table, said reaction being further characterized in that it is carried out in the presence of an inert gas.

4. The process for the production of ethanol which comprises passing a gaseous mixture of ethylene and water vapor, in a molar ratio of from 3:1 to 1:1, and carbon dioxide over a catalyst comprising a porous support impregnated with a heteropolyacid, the complex anion of which includes an element from group VI, sub-group A of the periodic table, said gaseous mixture being passed at a temperature of about 200° to about 300° C. and a pressure above about 50 atmospheres.

HERBERT G. TANNER.

CERTIFICATE OF CORRECTION.

Patent No. 2,173,187.  September 19, 1939.

HERBERT G. TANNER.

It is hereby certified that error appears in the printed specification of the above numbered patent requiring correction as follows: Page 1, second column, line 3, for the formula "$(O(PO_3)_2H_4$" read $(O(PO_3)_2)H_4$; page 2, first column, line 42, for "quanity" read quantity; and second column, line 53, for "and" read an; page 3, first column, line 12, for "acide" read acids; line 39, for "40" read 40°; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.